INVENTOR
C. C. CUTLER
BY [signature]
ATTORNEY

April 2, 1963 C. C. CUTLER 3,084,327

HIGH EFFICIENCY FREQUENCY MODULATION SYSTEM FOR TELEVISION AND SPEECH SIGNALS

Filed May 11, 1959 2 Sheets-Sheet 2

INVENTOR
C. C. CUTLER
BY [signature]
ATTORNEY

United States Patent Office 3,084,327

Patented Apr. 2, 1963

3,084,327

HIGH EFFICIENCY FREQUENCY MODULATION SYSTEM FOR TELEVISION AND SPEECH SIGNALS

Cassius C. Cutler, Gillette, N.J., assignor to Bell Telephone Laboratories, Incorporated, New York, N.Y., a corporation of New York Filed May 11, 1959, Ser. No. 812,549
13 Claims. (Cl. 325—45)

Figure 1A:
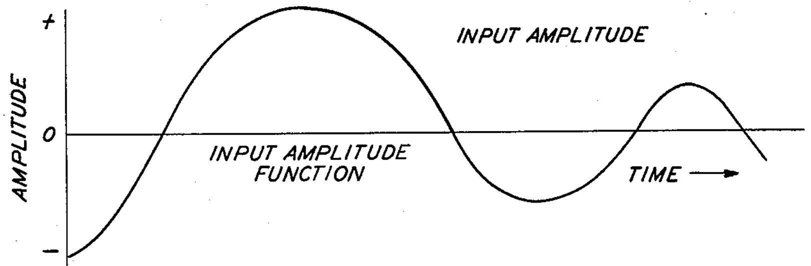

This invention relates to communication systems and more particularly to a frequency modulation system for the transmission of television and speech signals with efficient utilization of a limited portion of the radio frequency spectrum.

One of the problems which has received continual attention in the design of communication systems is that relating to the efficient use of radio frequency bandwidth. Here, efficiency may be considered both from the point of view of transmitting a given amount of information with a desired degree of accuracy within a restricted band of radial frequencies or from the point of view of efficiency in terms of the power required for acceptable communication of information between points. These problems become of particular importance as the radio frequency spectrum becomes more crowded and also as such crowding of the spectrum dictates the use of continually higher radio frequencies for communication purposes.

Frequency and phase modulation systems have been proposed for use in the efficient transmission of information because of the accuracy with which information may be communicated in the presence of extraneous noise. The bandwidth required for the transmission of a given amount of information, however, is greater than that required with amplitude modulation and the problem has been one of balancing the bandwidth requirement against the freedom from disruption of communication by noise and/or against the cost of power necessary to override noise. If frequency modulation is employed and the radio frequency bandwidth is restricted to a given value, there is imposed a fixed limit on the amplitude of message signals which can be transmitted without distortion. In phase modulation, on the other hand, there is no limit on the message or baseband signal amplitude but rather upon the rate of change of this amplitude. The choice of which kind of angular modulation is used depends somewhat upon the characteristic of the signal to be transmitted and in this connection it may be recognized that in both television and speech signals there exists a high degree of redundancy. If advantage is taken of this fact, it may be possible to reduce the bandwidth required for communication and at the same time to retain the noise advantage found in frequency modulation systems.

It is accordingly the object of the present invention to improve the efficiency with which radio frequency bandwidth is employed for the transmission of a given message signal while retaining the noise advantage commonly associated with frequency modulation.

In accordance with the above object, message signals are transmitted within a given radio frequency band which may ideally approximate twice the bandwidth of the original message signal by producing a radio frequency carrier frequency modulated at high index by the message signal and then sampling the frequency modulated carrier at a sampling rate determined in the first instance by the Nyquist sampling criterion. The sampled signal constitutes a train of pulses frequency modulated by the message signal, and is applied to a band pass filter having a bandwidth approximating the sampling rate. The output of the filter is radiated and at the receiver is applied to apparatus for reducing the modulation index of the frequency modulated intermediate frequency carrier for passage through a filter of considerably less bandwidth than that employed at the transmitter. Discrimination in the usual manner than permits recovery of the message signal.

Figure 2:
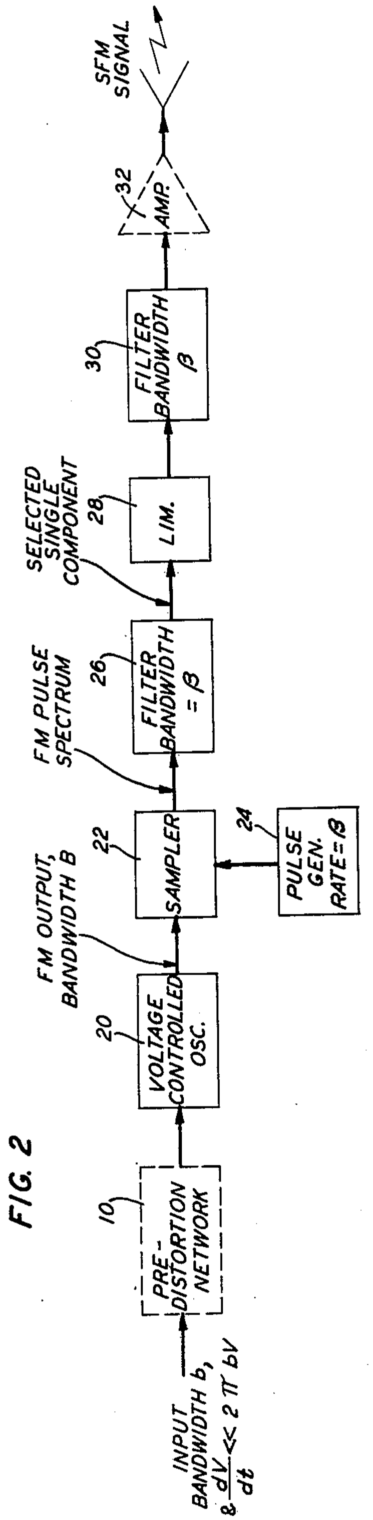
Figure 3:
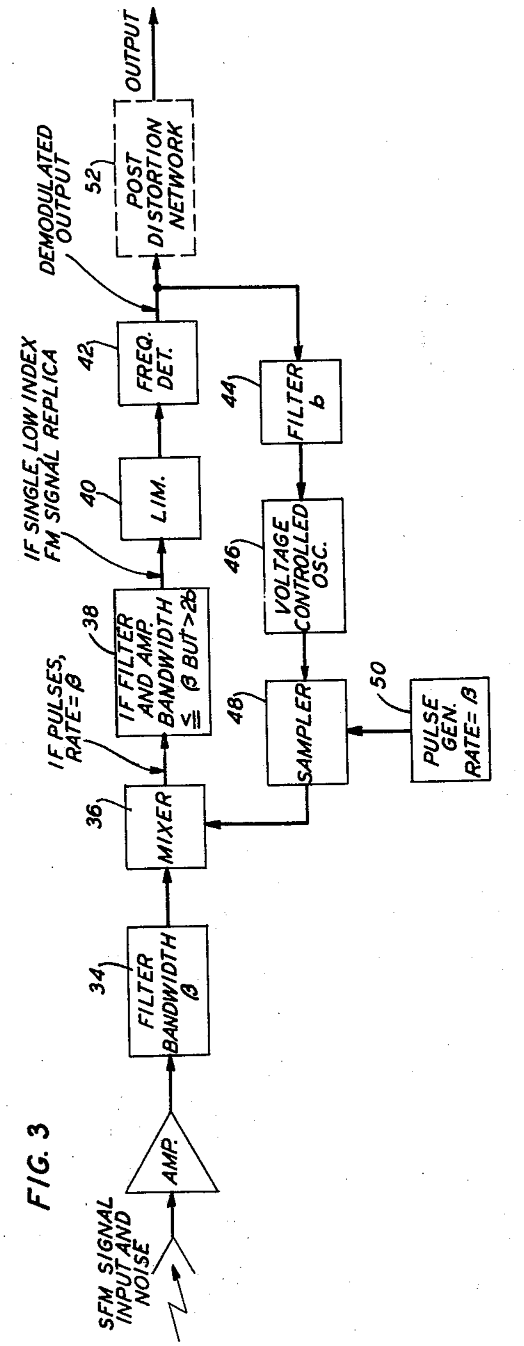

The above and other features of the invention will be described in the following specification taken in connection with the drawings in which:

FIGS. 1*a*, 1*b*, 1*c*, 1*d*, and 1*e* are graphs illustrative of the principles of operation of the communication system in accordance with the invention;

FIG. 2 is a block schematic diagram of transmitting apparatus which may be used in accordance with the invention; and FIG. 3 is a block schematic diagram of one form of receiver which may be used in connection with the transmitter of FIG. 2.

Figure 1B:
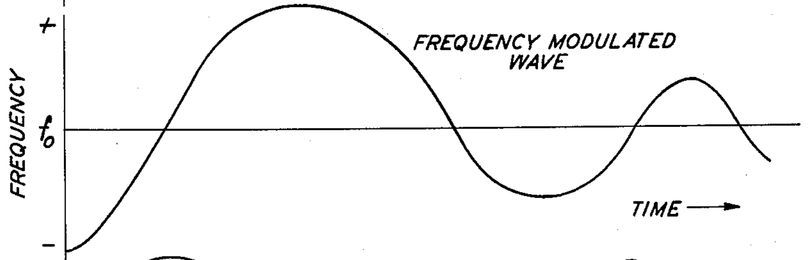
Figure 1C:
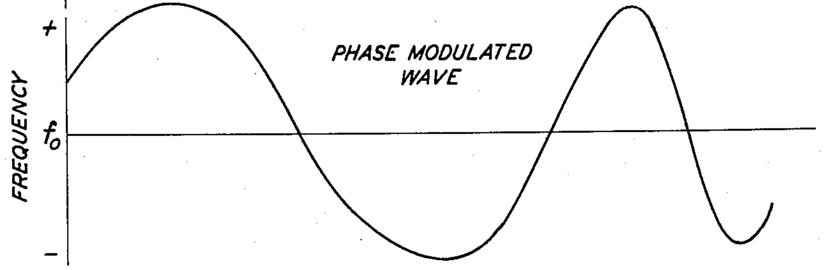

FIG. 1*a* is a graph of amplitude as a function of time illustrating a portion of a typical message signal to be transmitted. FIG. 1*b* is a graph of frequency as a function of time illustrating the variations which would be produced by the conventional frequency modulation of a carrier of center frequency $f_0$ in accordance with the message signal of FIG. 1*a*. It will be noted that the waveform of FIG. 1*b* appears the same as that for FIG. 1*a* and that the frequency of the radio frequency signal varies in exactly the same way as the amplitude of the modulating signal. This type of modulation provides a characteristic advantage or discrimination against noise and is, of course, widely used. Depending upon the index of modulation, however, a very wide band of radio frequencies may be required for the accurate transmission of the message wave. Modulation index as here used may be defined as the ratio of the change or variation of the radio frequency from the center frequency to the modulating frequency. Thus, the greater the modulation index for a given message signal frequency, the greater the radio frequency required to accommodate the message wave. In phase modulation, on the other hand, the instantaneous frequency is represented as shown in FIG. 1*c* as the time derivative of the instantaneous amplitude of the modulating signal and there is no inherent limit on the amplitude of the modulating signal which can be accommodated within a given radio frequency band. However, the slope or time rate of change of amplitude is limited and, unfortunately, noise voltages of low frequencies are enhanced, as compared to the case of frequency modulation.

It is the object of the present invention to reduce the radio frequency band required for high index frequency modulated carrier signals to a value which normally could be employed only for low index signals, and to accomplish this without incurring the penalty in noise discrimination ordinarily resulting from the use of phase modulation. As outlined briefly above, this object is accomplished by so modulating the radio frequency carrier that all of the necessary information for the transmission of the message may be represented by a narrower band of radio frequencies than ordinarily required. A typical circuit arrangement for accomplishing this end is shown in FIG. 2 of the drawings. Such reduction in bandwidth may be accomplished so long as the rate of change of amplitude of the message signal is not too great. This condition is ordinarily met without difficulty in both television and speech signals which usually have a high degree of redundancy.

As shown in FIG. 2, an input signal of bandwidth $b$ and a rate of time rate of change of amplitude $$\frac{dV}{dt}$$

much less than $2\pi bV$ is shown as applied by way of a predistortion network 10 as a modulating signal to a radio frequency oscillator 20. Use of the predistortion network is not essential and the conditions under which it may be desirable will be considered hereinafter. Radio frequency oscillator 20 may be a conventional voltage controlled oscillator, the instantaneous frequency of which is varied by the input signal to produce a frequency modulated output wave of the usual kind.

The output from modulated oscillator 20 is applied to a sampler 22 to which is also applied the output of a pulse generator 24, the repetition rate of which $\beta$ is chosen, as will be discussed in detail hereinafter, in accordance with Nyquist's sampling theorem, as modified in accordance with certain other factors including the nature of the message wave. Sampler 22 may take any number of forms, the simplest of which is a conventional gating circuit to the respective inputs of which are applied the output of the oscillator and that of the pulse generator, and the output of sampler 22 is a series of radio frequency pulses, the instantaneous frequencies of which are modulated by the message input wave. The resultant signal appearing at the output of the sampler is similar in many respects to that produced at the transmitter of the so-called "pulse heterodyne system" disclosed in my application Serial No. 243,105, filed August 22, 1951, now United States Patent 2,956,128, issued October 11, 1960.

According to the Nyquist sampling theorem, for satisfactory reproduction of a continuous wave, samples must be taken at a rate at least twice the highest frequency included in the wave to be reproduced. As a practical matter, it may be assumed for the present system that the message signal will not produce the maximum frequency swing in the radio frequency signal during any one sampling period and it is therefore sufficient if the sampling rate $\beta$ is greater than twice the maximum rate of change of this radio frequency during a sampling interval $1/\beta$ or $$\beta > 2\left(\frac{df}{dt}\right)_{max.} \cdot \frac{1}{\beta}$$

which yields the following when solved for $\beta$ $$\beta > \sqrt{2}\left(\frac{df}{dt}\right)^{1/2}_{max.}$$

The exact degree by which the sampling rate should exceed this value depends upon many factors and it is sufficient to state only that it must be at least greater and preferably considerably greater than this value.

Figure 1D:
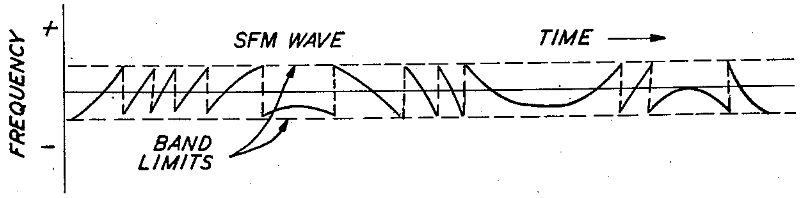
Figure 1E:
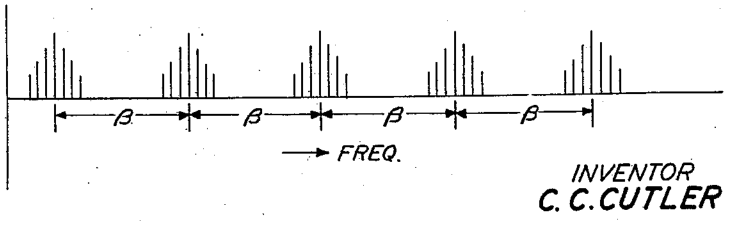

The output of sampler 22 may be considered in the frequency domain as consisting of a pulse spectrum the individual lines of which are separated by a frequency $\beta$ and are surrounded by a family of adjacent lines resulting in the frequency modulation of each spectrum line by the message signal. This is shown in FIG. 1*e* of the drawings. It will be noted that the spectrum, comprising a single spectrum line representing the carrier and the associated sideband lines, occurs in a bandwidth considerably less than the frequency interval $\beta$ which corresponds to the pulse repetition rate. Viewed in a slightly different manner, the output of the sampler may be considered as a sweeping line spectrum the individual lines of which (due to sampling of the carrier) are separated by the frequency interval $\beta$ determined by the sampling rate and all lines of which are swept or varied in frequency in response to modulation by the baseband signal. In any event, all of the information in the frequency modulated wave is carried by a single one of these frequency swept spectrum components.

Accordingly, the output of sampler 22 is applied to a band pass filter 26, the pass band of which is equal to $\beta$. It will be recognized that such a filter will transmit only a single frequency swept spectrum line. Thus, as a result of this operation upon the signal, all of the necessary information may be considered as compressed into a radio frequency band determined by the band pass filter. FIG. 1*d* illustrates the manner in which the instantaneous frequency of the radio frequency carrier varies in response to an input signal of the kind shown in FIG. 1*a* and represented by the frequency modulated wave of FIG. 1*b*. It will be noted that as the instantaneous frequency increases, it traverses the frequency band represented by the filter and effectively sweeps across the pass band of the filter. If the instantaneous frequency further increases, the next spectrum line of the pulse spectrum referred to above (which also gives all of the message signal information) enters the filter at the lower limit of the pass band and sweeps through the pass band as the instantaneous frequency increases. The dotted portions of the graph serve to indicate that a single spectrum line has swept through the pass band of the filter and is replaced by the next spectrum line. This process continues, as indicated by the serrated or saw-like character of the graph in FIG. 1*d*, until the rate of change of the instantaneous frequency decreases in response to a change in the slope of the message signal wave. Then the instantaneous frequency sweeps through the filter repeatedly in the opposite direction until the sign of the slope again reverses.

From the above it may be seen that the output of band pass filter 26 is a kind of frequency modulated wave having the equivalent of the high index of modulation of the original output of modulated oscillator 20 but having a discontinuous characteristic.

So long as the rate of change of amplitude is such that the signal can be resolved within the bandwidth of filter 26, all of the information necessary to represent the message signal is present. This may be seen by examination of the modulation process and it is evident that at any time the instantaneous value of modulation amplitude is measured by the instantaneous value of the radio frequency plus the number of times that the bandwidth of the filter has been swept through, multiplied by $\beta$. It will be noted from a consideration of the manner in which the filter was chosen and from examination of FIG. 1*d* that as one spectrum line leaves the filter another is just entering so that two frequencies may be present simultaneously within the pass band of the filter. This introduces an ambiguity which may be undesirable and may be eliminated by application of the output of the filter to a limiter 28.

A perfect limiter will pass two frequencies only if they are exactly equal in amplitude and any practical limiter will reduce to a very great degree the region of overlap between the two frequencies. Any intermodulation products between the two frequencies resulting from the action of the limiter may be eliminated by passing the output thereof through a second band pass filter 30 identical to band pass filter 26. After radio frequency amplification in amplifier 32 in the usual manner, the modulated signal is radiated. The additional limiter 28 and filter 30 are not strictly necessary to the operation of the system of the invention but serve further to clean up the radiated signal, i.e., to give a more uniform amplitude in the output without adding radiation at neighboring frequencies.

Consideration of the nature of the signal radiated will indicate that for sufficiently small amplitudes or a sufficiently low index of modulation the message signal will not cause the carrier frequency to sweep beyond the pass band of filters 26 and 30. The modulated wave may then be received in a conventional manner in a frequency modulation receiver. If, as is ordinarily the case, however, the message wave does cause the instantaneous frequency to sweep through the pass band of these filters, special arrangements must be provided to permit recovery of the message information. Briefly, such arrangements may take the form of means for effectively reducing the index of modulation of the radio frequency wave so that it may be transmitted through a filter or intermediate frequency amplifier having the same pass band as the filters at the transmitter. One attractive method of accomplishing this result involves the use of frequency modulation with feedback as described in articles by J. G. Chaffee and J. R. Carson appearing at pages 404 and 395, respectively, of the Bell System Technical Journal for July 1939. Depending upon the degree to which the feedback is applied, the effective modulation index may be reduced to any desired value. Briefly, this type of feedback involves use of the output of the frequency discriminator for the generation of a control signal by which the frequency of the beating oscillator is caused to follow that of the incoming modulated carrier at an interval equal to the desired intermediate frequency.

It is further necessary to operate on the received signal in such a way as to recover the baseband information. This may be accomplished by beating the incoming train of radio frequency pulses with a second train of radio frequency pulses having the same repetition rate as those of the incoming train but a center frequency (here, the radio frequency which is pulsed to obtain the beating pulse train) which differs from the corresponding frequency of the incoming pulse train by an amount appropriate for intermediate frequency amplification as taught in my copending application previously referred to herein.

As here applied, and as illustrated in FIG. 3 of the drawings, both pulse heterodyning and feedback are combined. Thus the incoming radio frequency signal is amplified and extraneous noise is removed by passage thereof through a band pass filter 34 having essentially the same pass band as filters 26 and 30 employed at the transmitter. The stripped signal is then applied to a conventional mixer 36 to which is also applied a beating signal derived in a manner which will be considered hereinafter. It is sufficient at this point to indicate that the beating signal constitutes a train of radio frequency pulses having the same repetition rate as those transmitted and varying in center frequency in the same manner as the modulated pulses from the transmitter. It can be shown that by an appropriate choice of the local oscillator center frequency, pulses of intermediate frequency appropriate for transmission through an amplifier having the same pass band as the filters employed at the transmitter may be obtained. If sufficient feedback of the frequency modulating signal is employed, the output of the intermediate frequency amplifier may be made a single continuous low index frequency modulated carrier which may be applied by way of a limiter 40 to a conventional discriminator 42 to recover the original modulating wave.

The control voltage required for establishing the frequency of local oscillator 46 is obtained by applying a portion of the output of discriminator 42 by way of a filter 44 as a control voltage for a voltage controlled oscillator 46. The nominal frequency of oscillator 46 is chosen to differ from that of oscillator 20 at the transmitter by the value desired for the intermediate frequency amplifier and filter 38. The transmission characteristics of amplifier-filter 38 and of filter 44 must be shaped according to well-known principles as required to insure stability in the feedback loop of which they are a part. Because of the pulsed nature of the incoming signal wave, the output of oscillator 46 is applied to a sampler 48, which may be identical to sampler 22, employed at the transmitter and which may be controlled by a pulse generator 50 operating at the same repetition rate as pulse generator 24 at the transmitter. By this arrangement, the output of mixer 36 may be considered as comprising a single spectrum component beat down to fall within the pass band of amplifier-filter 38 which is varied in frequency in accordance with the modulation originally applied at the transmitter, but with a lower index, depending upon the amount of feedback in the loop.

Although the receiver described is of particular utility in the system of the invention, it will be understood that other receiving arrangements may equally well be used to recover the message information from the doubly modulated radio frequency wave transmitted. Further, it may be desirable to avoid ambiguities in the representation of a particular modulating wave as, for example, in the transmission of television signals to predistort the baseband signal prior to application thereof to the transmitter and to provide complementary restoration at the output of discriminator 42 at the receiver. This may be accomplished by conventional emphasis and de-emphasis networks, shown at 10 of FIG. 2 and 52 of FIG. 3, for example, and the choice of characteristic to be employed will depend largely upon the message signals to be transmitted.

Although the arrangements of the invention are applicable to any frequency modulation transmission system in which the maximum rate of change of frequency of the frequency modulated wave is sufficiently reduced by the nature of the baseband signal, a typical system operating for the transmission of audio frequency signals in the commercial frequency modulation broadcast band might be arranged to accept audio frequency signals in the range extending to 10 kilocycles per second for transmission at a carrier frequency of approximately 100 megacycles per second. Assuming a frequency modulation swing of ±100 kilocycles per second, the sampling rate required for the transmission of normal speech, which is quite highly redundant in character in the sense that the information essential for understanding does not vary rapidly, would be approximately 100,000 samples per second. The bandwidth of the frequency restrictive filter 26 (FIG. 1) would be the same, namely, 100,000 cycles per second. This is, of course, considerably less than the total frequency excursion at the output of the frequency modulated oscillator 20, which would be 200,000 cycles per second.

What is claimed is:

1. In a system for transmitting baseband signals, means for providing in response to said baseband signals a train of radio frequency pulses, the center frequency of which is frequency modulated by said baseband signals, means for limiting the bandwidth of said modulated radio frequency pulses to a value of the order of but greater than twice the width of the band occupied by said baseband signals and related to the maximum rate of change of frequency in the interpulse interval, and means for radiating the resultant signals.

2. In a system for transmitting baseband signals having rates of change of instantaneous amplitude less than a predetermined value, means for producing in response to said baseband signals a train of radio frequency pulses, the center frequency of which is frequency modulated by said baseband signals, means for limiting the bandwidth of said modulated radio frequency pulses to a value substantially less than the full bandwidth but at least twice that of said given frequency band and at least equal to the square root of the derivative of instantaneous frequency as a function of time of the radio frequency signal, means for radiating the resultant signal to a receiving station, and means thereat for recovering the original baseband signal from the narrow band radio signal there received.

3. In a system for transmitting message signals falling within a given band of frequencies, means for frequency modulating a radio frequency carrier by said message signals, means for sampling the modulated carrier at a rate approximating in the limit twice the bandwidth of said message signals, means for limiting the bandwidth of the modulated and sampled radio frequency carrier to a value equal to the sampling rate, and means for radiating the resultant signal.

4. In a system for transmitting message signals falling within a given band of frequencies, means for frequency modulating a radio frequency carrier by said message signals, means for sampling the modulated carrier at a rate approximating twice the bandwidth of said message signals, means for limiting the bandwidth of the modulated and sampled radio frequency carrier to a value at least twice that of the message signals, means for radiating the resultant signal to a receiving station, and means at the receiving station for recovering the original message wave from the narrow band radio frequency signal there received.

5. In a system for transmitting baseband signals falling within a bandwidth $b$, means for frequency modulating a radio frequency carrier by said baseband signals, a gate circuit, means for applying said frequency modulated signals to said gate circuit, means for enabling said gate circuit at a repetition rate $\beta > 2b$, means for limiting the bandwidth of the modulated radio frequency carrier at the output of said gate circuit to a value approximating $\beta$, means for radiating the resultant signal, and receiving means for recovering the original modulating wave from the narrow band radio frequency output of said frequency limiting means.

6. In a system for transmitting baseband signals falling within a bandwidth $b$, means for producing in response to said baseband signals a train of radio frequency pulses, the repetition rate $\beta$ of which is greater than $2b$, the center frequency of said train being frequency modulated by said baseband signals, filter means for limiting the bandwidth of said modulated radio frequency pulses to a value $\beta$, a limiter, means for applying the output of said filtering means thereto, and means for radiating the output of said limiter.

7. In a system for transmitting baseband signals falling within a bandwidth $b$, means for producing in response to said baseband signals a train of radio frequency pulses of repetition rate $\beta > 2b$, the center frequency of which is frequency modulated thereby, filter means for limiting the bandwidth of said modulated radio frequency pulses to a value $\beta$, a limiter, means for applying the output of said filtering means thereto, filter means identical to said first-mentioned filter means connected at the output of said limiter, and means for radiating the output of said last-mentioned filter means.

8. In a system for transmitting baseband signals, means for frequency modulating a radio frequency carrier by said baseband signals, means for sampling said modulated carrier at a repetition rate related to the bandwidth of said baseband signals, means for limiting the bandwidth of the modulated and sampled radio frequency carrier to a value related to the sampling rate and greater than twice the bandwidth of said baseband signals, means for radiating said band limited signals, a receiver for said radiated signals, means at the receiver for producing a train of radio frequency pulses of the same repetition rate as those radiated and differing in center frequency therefrom, means for combining said train of radio frequency pulses with pulses received to produce an intermediate frequency signal falling within a frequency band equal to the band of the frequency, limiting means at the transmitter, and means for recovering the original baseband signal from said intermediate frequency signal.

9. In a system for transmitting baseband signals, means for frequency modulating a radio frequency carrier at a given modulation index by said baseband signals, means for sampling said modulated carrier at a rate approximating greater than twice the bandwidth of said baseband signals, means for limiting the bandwidth of the modulated and sampled radio frequency carrier to a value equal to said sampling rate for radiation, a receiver, means at the receiver for producing from received radio frequency signals an intermediate frequency train of frequency modulated pulses, an intermediate frequency amplifier of bandwidth approximating that of the frequency limiting means at the transmitter, and means for reducing the modulation index of said intermediate frequency pulses so that the modulated pulses will fall within the band limits of said intermediate frequency amplifier.

10. In a system for transmitting baseband signals, means for frequency modulating a radio frequency carrier at a given modulation index by said baseband signals, means for sampling said modulated carrier at a rate approximating twice the bandwidth of said baseband signals, means for limiting the bandwidth of the modulated and sampled radio frequency carrier to a value greater than twice that of the baseband signals for radiation, a receiver, means at the receiver for producing from received radio frequency signals an intermediate frequency train of frequency modulated pulses, an intermediate frequency amplifier of bandwidth approximating that of the frequency limiting means at the transmitter, and frequency demodulating means for recovering the original baseband signal from the output of said intermediate frequency amplifier.

11. In a system for transmitting baseband signals, means for frequency modulating a radio frequency carrier at a given modulation index by said baseband signals, means for sampling said modulated carrier at a rate approximating twice the bandwidth of said baseband signals, means for limiting the bandwidth of the modulated and sampled radio frequency carrier to a value greater than twice that of the baseband signals for radiation, a receiver, a local oscillator and mixing means at the receiver for producing from received radio frequency signals an intermediate frequency train of frequency modulated pulses, an intermediate frequency amplifier of bandwidth approximating that of the frequency limiting means at the transmitter, means for deriving from the output of said frequency demodulator a control voltage, and means responsive to said control signal for adjusting the center frequency of said local oscillator to follow variations in the received radio frequency with a constant frequency difference equal to said intermediate frequency to reduce the modulation index of the intermediate frequency signals.

12. In a system for transmitting baseband signals, means for producing a train of radio frequency pulses modulated by said baseband signals, means for restricting the bandwidth of said modulated pulses to a value approximating that required for transmission of a single carrier frequency component of said train modulated by said baseband signals, means for radiating said restricted signals, means for receiving the radiated signals, said receiving means comprising a local oscillator normally adjusted to a radio frequency differing from the center frequency of the radio frequency signals produced at the transmitter by a desired intermediate frequency, means for sampling the output of said local oscillator at the same repetition rate as that employed in the generation of the signals transmitted, means for combining the sampled output of said local oscillator and the incoming pulsed signals, means for limiting the bandwidth of the output of said combining means to a value approximating the bandwidth within which signals were produced at the transmitter, means for frequency demodulating said bandwidth limited signals from said combining means, and means responsive to the demodulated output for adjusting the frequency of said local oscillator to follow changes in frequency of the received radio frequency carrier in response to modulation by said baseband signals.

13. In a system for transmitting baseband signals within a band of radio frequencies of limited width, means for converting a radio frequency carrier modulated by said baseband signals at a given modulation index to a pulse train having a repetition rate of the order of twice the bandwidth of said baseband signals, means for limiting the bandwidth of said pulsed wave to a value commensurate with said repetition rate, means for transmitting the bandwidth limited signals, receiving means, means for reducing the modulation index of signals received thereby to permit all signal information to pass without distortion through a filter of bandwidth equal to that employed as a frequency limiting filter at the transmitter, and means to recover the baseband signals from the output of said filter.

References Cited in the file of this patent

UNITED STATES PATENTS

| | | |
|---|---|---|
| 2,361,437 | Trevor | Oct. 31, 1944 |
| 2,383,359 | Ziegler | Aug. 21, 1945 |